United States Patent [19]

Tilkens

[11] 4,273,220

[45] Jun. 16, 1981

[54] OLEO DAMPERS HAVING VARIABLE ORIFICES

[75] Inventor: Lucien Tilkens, Zolder, Belgium

[73] Assignee: Yamaha Hatsudoki Kabushiki Kaisha, Iwata, Japan

[21] Appl. No.: 58,065

[22] Filed: Jul. 16, 1979

[30] Foreign Application Priority Data

Jul. 20, 1978 [JP] Japan ................................ 53/88883

[51] Int. Cl.³ .............................................. F16F 9/50
[52] U.S. Cl. ..................................... 188/282; 188/289
[58] Field of Search ............... 188/269, 280, 282, 284, 188/289, 276

[56] References Cited

U.S. PATENT DOCUMENTS 2,069,791  2/1937  Wallace ........................... 188/289 X
3,400,833  9/1968  Powell ............................. 188/289 X Primary Examiner—Duane A. Reger
Attorney, Agent, or Firm—Donald D. Mon

[57] ABSTRACT

Oleo damper including a housing, a movable partition disposed in the housing for dividing the inside chamber of the housing into an oil compartment and a gas compartment, a damping piston disposed in the oil compartment, and a stationary partition disposed in the oil compartment between the piston and the movable partition. The stationary partition has an orifice which is cooperating with a needle carried on the movable partition. The needle has a diameter gradually decreasing toward the movable partition so that the orifice area is decreased as the movable partition is displaced away from the stationary partition.

7 Claims, 4 Drawing Figures

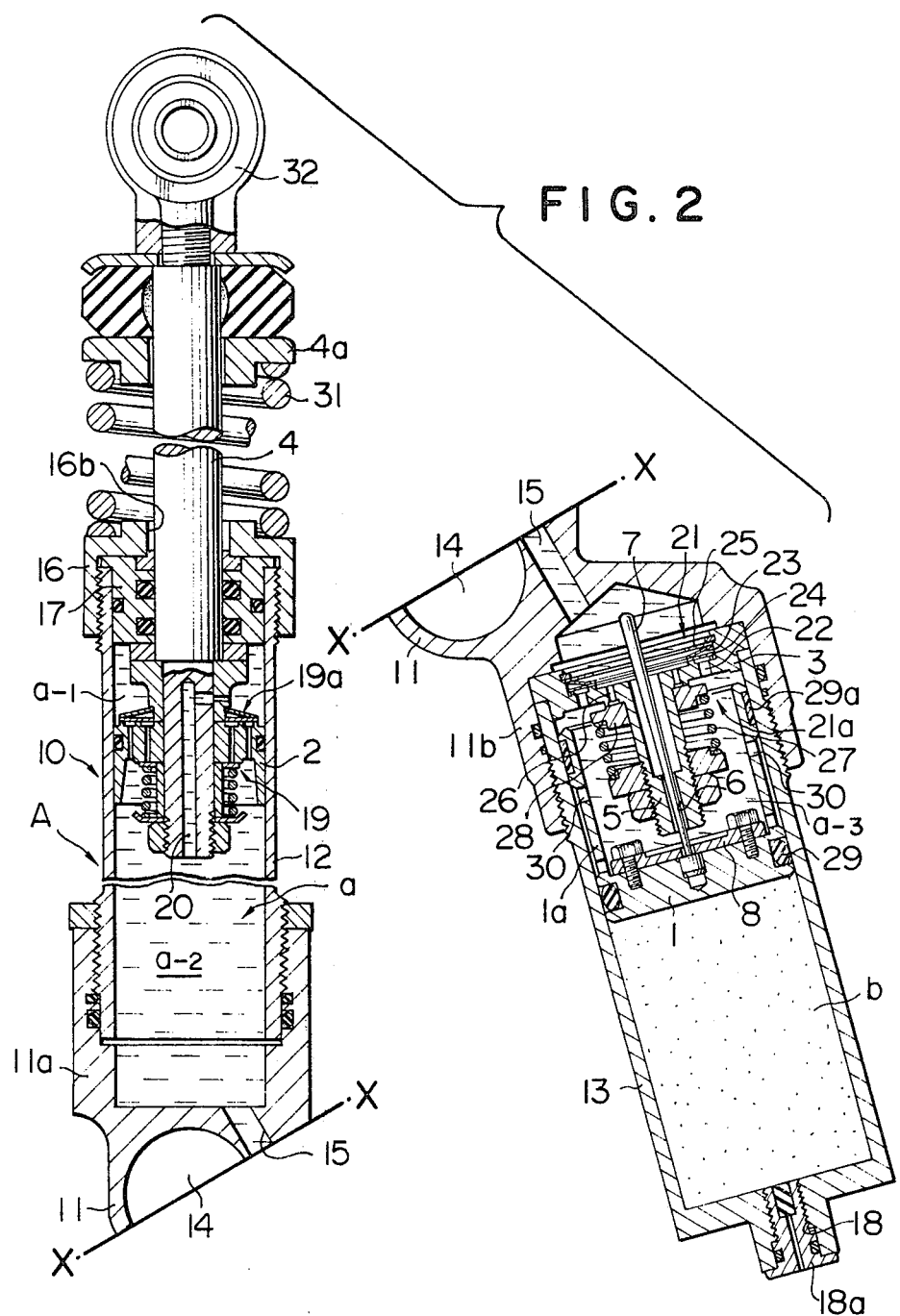

OLEO DAMPERS HAVING VARIABLE ORIFICES

FIELD OF THE INVENTION

The present invention relates to oleo dampers for absorbing shock loads. More particularly, the present invention pertains to oleo dampers comprised of cylinder means having movable partition means dividing the inside of the cylinder means into gas chamber means and oil chamber means, movable piston means disposed in the oil chamber means, and stationary partition means having orifice means and disposed in the oil chamber means between the movable partition means and the piston means.

BACKGROUND OF THE INVENTION

In the aforementioned type of oleo dampers, the orifice means has been recognized as having a great influence on the damping property. Where the orifice is of a type having a constant area, inconveniencies will be encountered in that an appropriate damping property cannot be ensured throughout the load range. When the orifice area is so determined that the damper provides a desirable damping property against a shock load which is relatively small, an adequate damping effect cannot be afforded when the damper is subjected to a large shock load. On the contrary, when the orifice area is such that an adequate damping effect is obtained against a relatively large shock load, the damper will become so stiff that a proper damping cannot be afforded against a small shock load. In case where the oleo damper is applied to a motorcycle, it cannot provide a satisfactory damping both in operation on a rough surface and on a relatively smooth surface.

In order to solve the problem, proposals have been made to provide means for changing the orifice area in accordance with the amount of the shock load. For example, in Japanese utility model publication Sho 48-39515 published on Nov. 20, 1973, there is disclosed an oleo damper having a tapered needle adapted to be inserted into an orifice aperture formed in a piston so that the orifice area is changed by the needle in accordance with the position of the piston. Since the position of the piston is dependent on the amount of shock load, the orifice area is in effect changed in accordance with the shock load. Similar devices are also disclosed by Japanese patent publications Sho 52-14831 published on Apr. 25, 1977 and Sho 52-16555 published on May 10, 1977.

The oleo dampers in accordance with these proposals are considered as having a wide range of adaptability because the orifice area is changed in accordance with the amount of shock load so that appropriate damping property is afforded throughout a wide range of shock load. However, these known dampers still have disadvantages because they have no temperature compensating means. Hydraulic oil in the oleo damper is subjected to a temperature rise in use and such temperature rise causes a decrease in the viscosity of oil. Thus, there will be a decrease in damping effect in accordance with an increase in the oil temperature.

It is therefore an object of the present invention to provide an oleo damper in which damping orifice area is changed in accordance with the amount of shock load and also with the oil temperature.

Another object of the present invention is to provide an oleo damper which can be used in a wide range of oil temperature and against a wide range of shock load.

BRIEF DESCRIPTION OF THE INVENTION

According to the present invention, the above and other objects can be accomplished by an oleo damper comprising housing means having inside chamber means, movable partition means separating the chamber means into oil compartment means and gas compartment means, said gas compartment means being charged with pressurized gas and said oil compartment means with hydraulic oil, at least a part of said oil compartment means being defined by cylinder means, piston means disposed in said cylinder means for reciprocating movement and having restricted passage means for allowing restricted flow of the hydraulic oil across the piston means in response to the reciprocating movement of the piston means, said piston means being provided with piston rod means extending outwardly through the housing means, stationary partition means disposed in said oil compartment means between said piston means and said movable partition means and having orifice means, said movable partition means having metering needle means extending toward said stationary partition means and inserted into said orifice means, said needle means having cross-sectional area which decreases toward said movable partition means whereby the orifice means is decreased in effective area when the movable partition means is displaced away from the stationary partition means. In a simplest and preferable mode of the present invention, the needle means is in the form of a needle which is tapered so that the needle diameter is gradually decreased toward the movable partition and extending through the orifice. As the pressure of oil in the oil compartment increases as the result of shock load applied to the damper, the movable partition means is displaced apart from the stationary partition means so that the needle is moved with respect to the orifice to decrease the orifice area. Since the position of the movable partition means is dependent on the amount of the shock load, the orifice area is controlled in accordance with the load applied to the damper. When there is any increase in the temperature of oil, there will be a corresponding increase in the volume of oil so that the movable partition will also be displaced accordingly. The orifice area is therefore decreased in accordance with an increase in the oil temperature and the decrease in the oil viscosity can thus be compensated for.

In a preferable aspect of the present invention, the movable partition means is in the form of a floating piston. It should however be noted that the movable partition means may be comprised of a diaphragm or other similar element. The stationary partition means may additionally be provided with restricted passage means to allow restricted flow of oil therethrough.

The above and other objects and features of the present invention will become apparent from the following descriptions of a preferred embodiment taking reference to the accompanying drawings, in which;

BRIEF DESCRIPTION OF THE DRAWINGS

FIG. 2 is a sectional view of the oleo damper in accordance with one embodiment of the present invention;

DETAILED DESCRIPTION OF THE INVENTION

Figure 1:
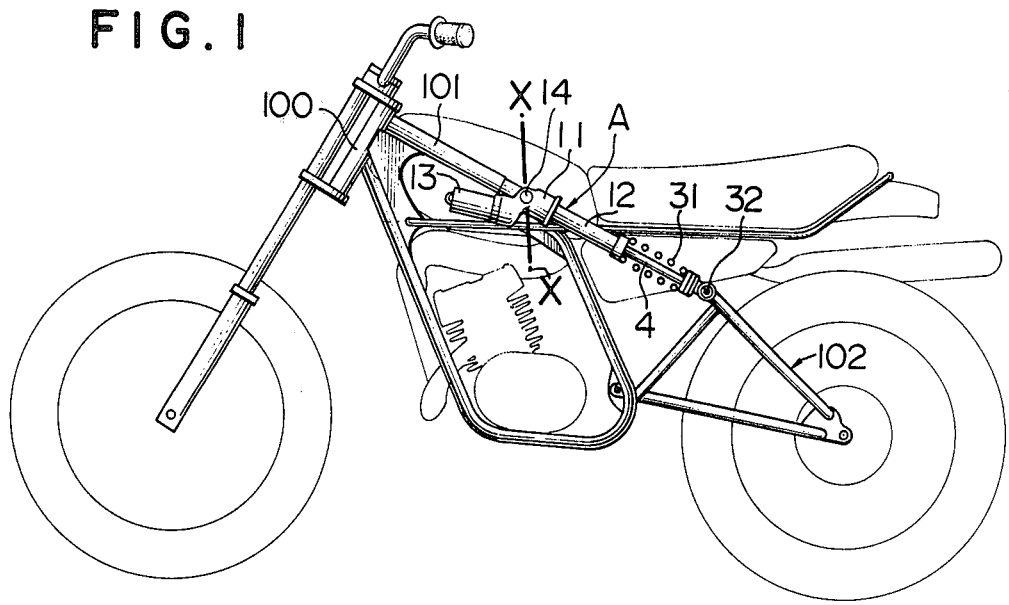
FIG. 1 is a side view of a motorcycle having an oleo damper to which the present invention can be embodied.

Referring now to the drawings, particularly to FIG. 1, there is shown a motorcycle having an oleo damper to which the present invention can be applied. The motorcycle includes a frame comprised of a head pipe 100, a main pipe 101 and a triangular rear arm 102. An oleo damper A is connected to extend between the main pipe 101 and the rear arm 102.

Referring to FIG. 2, it will be seen that the oleo damper A includes a housing 10 which is comprised of a first cylinder 12 and a second cylinder 13 which are connected together by an intermediate eyelet fitting 11. The eyelet fitting 11 has two cylindrical socket portions 11a and 11b which are arranged with axes oriented in different directions. The socket portion 11a is in threaded engagement with one end of the first cylinder 12 whereas the socket portion 11b is in threaded engagement with one end of the second cylinder 13. A passage 15 is formed in the fitting 11 to connect the inside of the first cylinder 12 with that of the second cylinder 13. The eyelet fitting 11 is formed with an eyelet opening 14 which is in this example adapted to be used for connection with the rear end of the main pipe 101.

The other end of the first cylinder 12 is opened and provided with a seal assembly 17 which is secured in position by means of an end cap 16. The other end of the second cylinder 13 is closed and at the closed end there is formed a gas charging aperture 18 which is closed by a plug 18'. A stationary partition plate 3 is disposed at the junction between the eyelet fitting 11 and the second cylinder 13, and secured in position by the adjacent end of the second cylinder 13 and a cooperating shoulder formed in the eyelet fitting 11. A movable partition or a floating piston 1 is disposed in the second cylinder 13 to divide the inside of the cylinder 13 into an oil compartment a and a gas compartment b. The oil compartment a is defined at the side of the movable partition 1 adjacent to the stationary partition plate 3 while the gas compartment b is defined at the side adjacent to the closed end of the cylinder 13.

In the first cylinder 12, there is disposed a piston 2 which has a piston rod connected thereto and extending outwardly through an axial bore 16a of the end cap 16 and the seal assembly 17. An eyelet fitting 32 is provided at the outer end of the piston rod 4 for connecting the rod to the rear arm 101 of the motorcycle. The piston rod 4 has a spring seat 4a which receives one end of a compression spring 31, the other end of the spring 31 being supported by the end cap 16 so that the piston rod 4 is normally biased toward the extended position. As the rear arm 101 of the motorcycle is swung, the piston rod 4 is forced into a retracted position.

Figure 4:
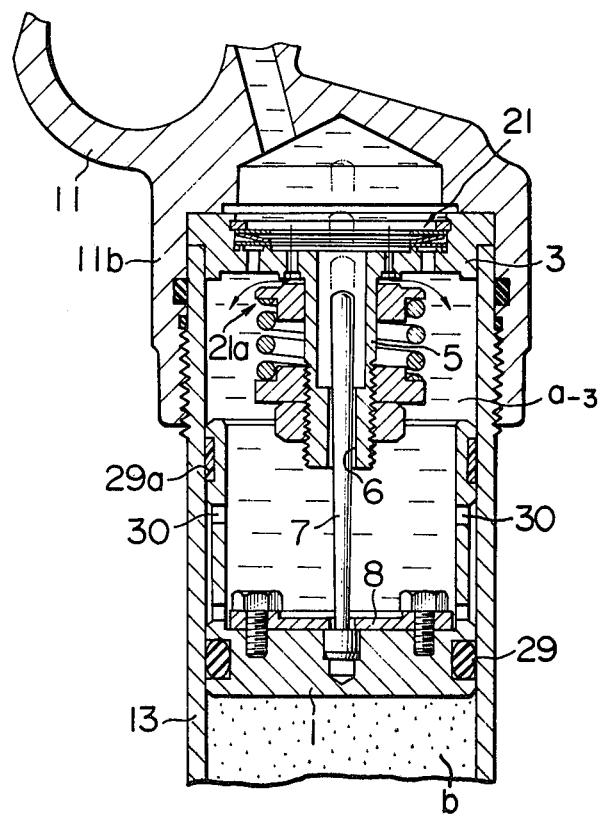
Figure 3:
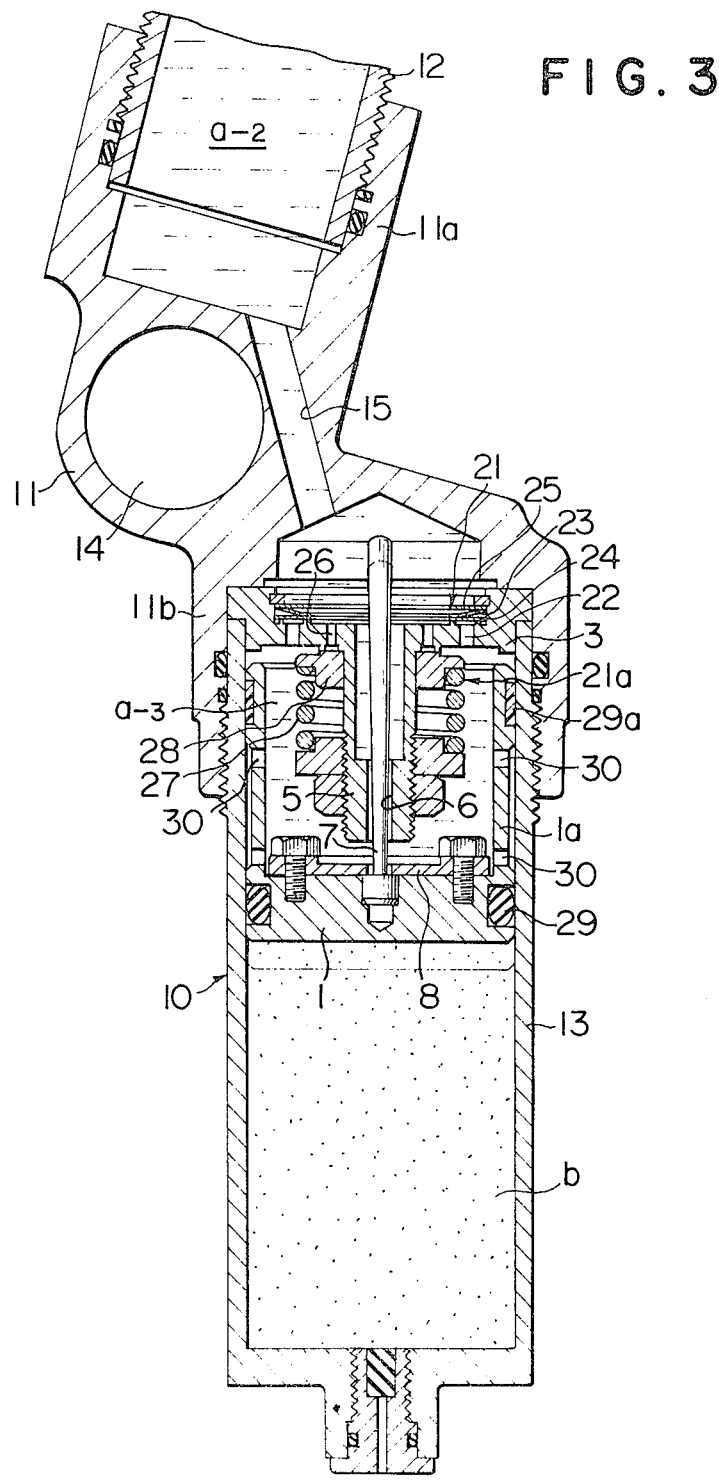
FIG. 3 is a sectional view in an enlarged scale to show the variable orifice arrangement; and, FIG. 4 is a sectional view similar to FIG. 3 but showing the movable partition in a different position.

As shown in detail in FIGS. 3 and 4, the stationary partition plate 3 is formed with a suitable number of circumferentially spaced holes or passages 22 and a further set of holes or passages 26. Thus, the oil compartment a in the cylinder 13 is connected through these passages and through the passage 15 with the chamber in the cylinder 12 so that the chamber in the cylinder 12 constitutes a part of the oil compartment a. Since the chamber in the cylinder 12 is separated by the piston 2 into two compartments, the compartments above and beneath the piston 2 are designated by the references a-1 and a-2, respectively, while the compartment between the plate 3 and the movable partition by a-3. The passages 22 are adapted to be controlled by a check valve 21 comprised of an annular valve member 24 which is forced into a closed position by a dish-shaped spring 23 supported by an annular backing member 25. The check valve 21 thus permits oil flow only from the compartment a-3 to the compartment a-2.

The partition plate 3 is integrally and coaxially formed with a tubular portion 5 which extends axially toward the movable partition 1 and has an orifice 6 formed at the extreme end thereof. At the outside of the tubular portion 5, there is carried a valve member 28 which is forced by a spring into a closed position in which it closes the passages 26. The valve member 28 thus constitutes a check valve 21a which allows oil flow only toward the compartment a-3.

The movable partition 1 has a needle 7 which is secured thereto by means of a plate 8 and extends axially through the orifice 6 and the tubular portion 5. The needle 7 has a diameter gradually increasing toward the free end thereof. Therefore, the effective area of the orifice 6 is changed in accordance with the position of the movable partition 1. More particularly, when the movable partition 1 is displaced away from the stationary partition 3 as shown by phantom lines in FIG. 3 or as shown in FIG. 4, the orifice area is correspondingly decreased.

The movable partition 1 is integrally formed with a cylindrical wall 1a which extends along the inner wall of the second cylinder 13 toward the stationary partition plate 3. An O-ring 29 is provided along the periphery of the movable partition 1 and a second seal member 29a is provided around the wall 1a. Apertures 30 are formed in the wall 1a so that oil is passed between the wall 1a and the inner wall of the second cylinder 13. The arrangement is advantageous in that the needle 7 can be firmly maintained in axial alignment with the orifice 6.

Referring back to FIG. 2, the piston 2 in the first cylinder 12 is provided with passages connecting the compartments a-1 and a-2 and controlled by a check valve 19 which allows oil flow only from the compartment a-1 to the compartment a-2. The piston 2 is further formed with passages which are controlled by a second check valve 19a which allows oil flow only toward the compartment a-1. The piston rod 4 is formed with a restricted oil passage 20. Thus, as the piston rod 4 moves between the extended and retracted positions, the piston 2 is moved axially so that oil in the cylinder 12 is displaced from one compartment to the other applying a damping effect to the movement of the piston 2.

When a shock load is applied to the damper, the piston rod 4 is retracted under the load so that there will be an increase in the oil pressure in the compartment a-2 due to a corresponding movement of the piston 2. Further, the portion of the piston rod 4 which has entered the cylinder 12 functions to displace the oil from the cylinder 12. Therefore, a certain amount of oil is displaced from the compartment a-1 through the passage 15 in the eyelet fitting 11 and the passages 26 and the orifice 6 in the stationary partition plate 3 into the compartment a-3 causing a corresponding displacement of the movable partition 1. In the return stroke of the piston rod 4, oil is displaced back from the compartment a-3 to the compartment a-2 through the passages 22 and the orifice 6 in the plate 3 and the passage 15 in the eyelet fitting 11. Thus, the movable partition 1 is correspondingly moved toward the plate 3.

It will be understood that the distance of the movement of the piston 2 is dependent on the amount of shock load and therefore the distance of the displacement of the movable partition 1 is dependent on the shock load. When a large load is applied to the damper, the movable partition 1 is displaced by a greater distance than in a case where a smaller load is applied. Thus, the effective area of the orifice 6 is decreased and oil flow through the orifice 6 is further restricted to thereby strengthen the damping effect.

When there is an increase in oil temperature in operation due to an internal friction in the oil, there will be a corresponding increase in the volume of oil and consequently the movable partition will be displaced away from the plate 3. The effective area of the orifice 6 is therefore decreased to provide an increased restriction. Although the viscosity of oil will be decreased in accordance with an increase in the oil temperature, there will be no change in damping effect since the effective area of the orifice 6 is thus decreased. It will therefore be understood that in the arrangement described above any change in the viscosity of oil due to a change in the oil temperature can be compensated for by the displacement of the needle 7 with respect to the orifice 6.

The invention has thus been shown and described with reference to a specific embodiment, however, it should be noted that the invention is in no way limited to the details of the illustrated structures but changes and modifications may be made without departing from the scope of the appended claims. For example, in the illustrated embodiment, the stationary and movable partitions are disposed in a cylinder which is separately provided from the one in which the piston is disposed, however, they may be arranged in the same cylinder as the piston is. Further, the movable partition may not necessarily be in the form of a floating piston but may be comprised of a diaphragm. In such a case, the second cylinder may be substituted by a non-cylindrical housing member such as a spherical member.

I claim:

1. An oleo damper comprising housing means having inside chamber means, movable partition means separating the chamber means into oil compartment means and gas compartment means being chargeable with pressurized gas and said oil compartment means with hydraulic oil, at least a part of said oil compartment means being defined by cylinder means for reciprocating movement and having restricted passage means for allowing restricted flow of the hydraulic oil across the piston means in response to the reciprocating movement of the piston means, said piston means being provided with piston rod means extending outwardly through the housing means, stationary partition means disposed in said oil compartment means between said piston means and said movable partition means and having orifice means, said movable partition means having metering needle means extending toward said stationary partition means and inserted into said orifice means, said needle means having cross-sectional area which decreases toward said movable partition means whereby the orifice means is decreased in effective area when the movable partition means is displaced away from the stationary partition means by increase in temperature of the oil which causes increase in the oil volume and therefore enlargement of said oil compartment, and of axial shock.

2. An oleo damper in accordance with claim 1 in which said needle means includes at least one needle which is tapered so as to have a diameter gradually decreasing toward the movable partition means.

3. An oleo damper in accordance with claim 1 in which said movable partition means is comprised of a floating piston disposed in a cylindrical chamber in said housing means.

4. An oleo damper in accordance with claim 3 in which said floating piston is formed with a cylindrical wall extending along said cylindrical chamber.

5. An oleo damper in accordance with claim 3 in which said stationary partition means has tubular means extending toward said movable partition means, said tubular means having end means adjacent to said floating piston, said orifice means being provided in said end means of the tubular means.

6. An oleo damper in accordance with claim 5 in which said floating piston is formed with a cylindrical wall extending along said cylindrical chamber toward said stationary partition means.

7. An oleo damper in accordance with claim 1 in which said housing means comprises a first cylinder and a second cylinder which are connected together by a fitting having at least one communication passage, said piston means being disposed in said first cylinder with the piston rod means extending outwardly through an end of the first cylinder which is remote from the fitting, said movable partition means being comprised of a floating piston disposed in said second cylinder, said stationary partition means being disposed at an end of said second cylinder which is adjacent to the fitting.

* * * * *